United States Patent [19]
Naciri et al.

[11] Patent Number: 5,644,639
[45] Date of Patent: Jul. 1, 1997

[54] DEVICE FOR CARRYING OUT A DIVISION

[75] Inventors: Robert Naciri, Chatenay Malabry; Jean P. Bournas, Chaville, both of France

[73] Assignee: U.S. Philips Corporation, New York, N.Y.

[21] Appl. No.: 614,921

[22] Filed: Mar. 11, 1996

Related U.S. Application Data

[63] Continuation of Ser. No. 502,547, Jul. 14, 1995, abandoned, which is a continuation of Ser. No. 194,299, Feb. 8, 1994, abandoned.

[30] Foreign Application Priority Data

Feb. 8, 1993 [FR] France ................... 93 01357

[51] Int. Cl.$^6$ ............... H04L 9/30; G06F 7/49; G06K 19/073
[52] U.S. Cl. ............... 380/30; 380/23; 235/380; 364/761; 364/746
[58] Field of Search ............... 364/746, 761; 380/30, 23; 235/380

[56] References Cited

U.S. PATENT DOCUMENTS

| | | | |
|---|---|---|---|
| 4,351,982 | 9/1982 | Miller et al. | 380/30 |
| 4,405,829 | 9/1983 | Rivest et al. | 380/30 |
| 4,514,592 | 4/1985 | Miyaguchi | 380/30 |
| 4,949,293 | 8/1990 | Kawamura et al. | 364/746 |
| 5,101,431 | 3/1992 | Even | 380/30 |
| 5,144,574 | 9/1992 | Morita | 364/746 |

FOREIGN PATENT DOCUMENTS 0443679  8/1991  European Pat. Off. .

*Primary Examiner*—Gilberto Barrón, Jr.
*Attorney, Agent, or Firm*—Debra K. Stephens

[57] ABSTRACT

This device is designed for carrying out a division of a dividend A formed by "m" words with a base "b" by a divisor D. It comprises an active memory (2), a multiplication member which forms part of a calculation unit (8) provided with a first input ($x_i$) for "x" words of a multiplicand and with a second input ($A_i$) for "y" words of a multiplier. Accumulating means are provided for adding to locations of the memory (2) a multiple of a quantity $db_k.b^j$ worked out by the said multiplication member, as well as testing means for providing an indication of the zero value of a separator S in the said location, and for activating the cumulation means until the testing means provide the said indication, as well as decrementation means for decrementing the value J at each indication. The remainder of the division is present in the last locations, and the quotient in the first ones.

8 Claims, 3 Drawing Sheets

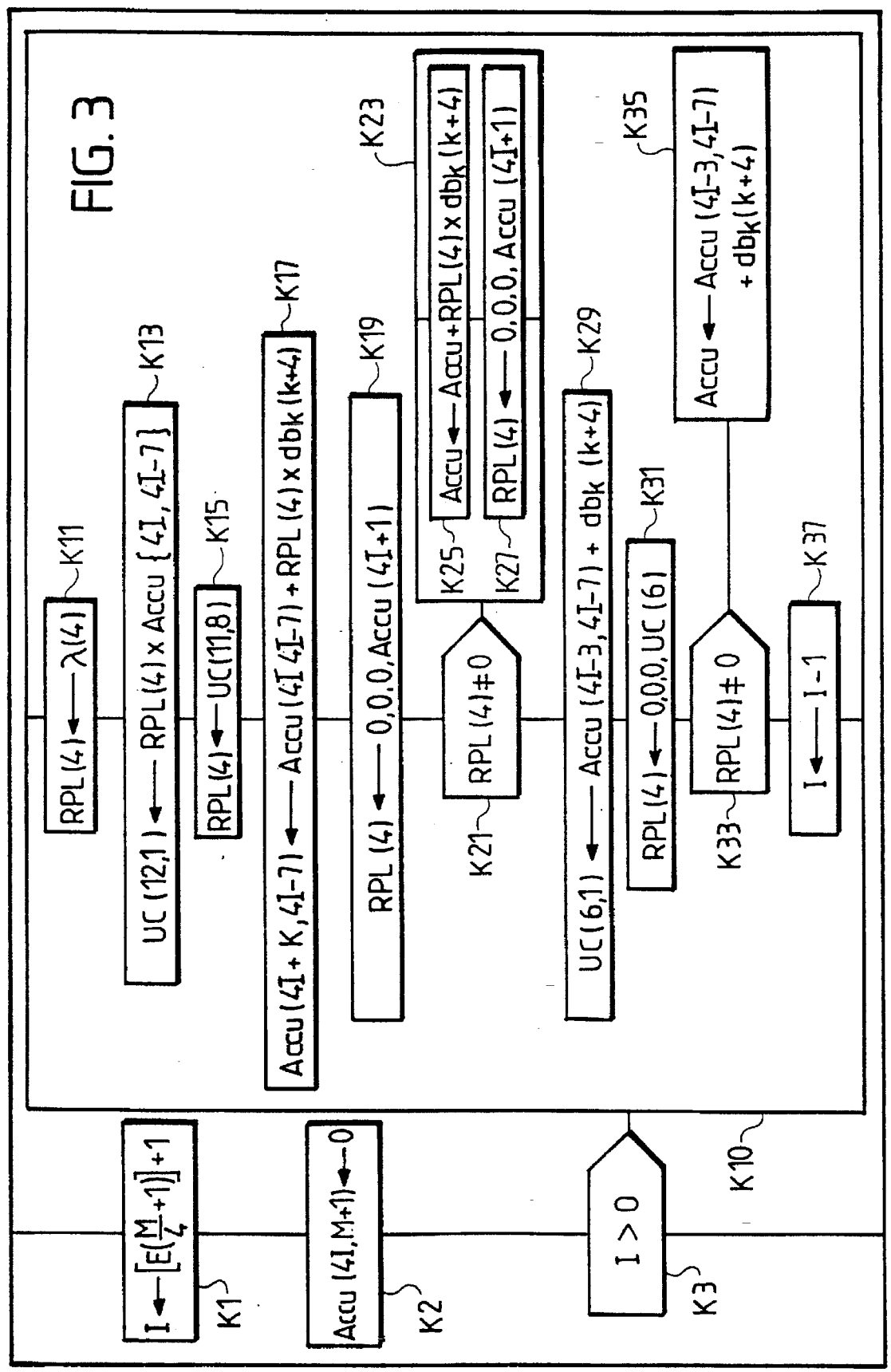

DEVICE FOR CARRYING OUT A DIVISION

This is a continuation of application Ser. No. 08/502,547, filed Jul. 14, 1995 abandoned which is a continuation of Ser. No. 08/194,299 filed Feb. 8, 1994 abandoned.

BACKGROUND OF THE INVENTION

The invention relates to a device for carrying out a division of a dividend A by a divisor D formed by "n" words expressing a base "b" so as to obtain a quotient Q and a remainder R.

Such a device finds its major applications in fields where divisions of great numbers are required. There is, however, a preferred field of application for the invention: the field of microcircuit boards using the RSA encoding process. This process, which is described in the U.S. Pat. No. 4,405,829 of Rivest, Shamir and Adleman, 1978, is a system with a public key "e". It is based on the difficulty of splitting up a large number "N", which is the product of two original numbers "p" and "q", into factors.

The basic operation of this encoding system can be described as follows. The message to be encoded is given the form of a chain of separate numbers in blocks M of fixed length, smaller than N. Each block presents a cryptogram C by means of an exponent "e" which may be known to the public and which is a number which divides neither "p−1" nor "q−1", carrying out the following operation:

$$C = M^e \pmod{N}$$

in which (mod N) indicates that the operation is carried out in accordance with a modulo N.

To re-establish the message, the receiver must know a secret exponent "d" and carry out the operation:

$$M = C^d \pmod{N}, \text{ i.e.:}$$

$$M = M^{de} \pmod{N}$$

A presently used number of binary elements constituting N is 512, which corresponds to approximately 155 decimal figures, then a length of the order of 256 binary elements each is taken for "p" and "q". The devices carrying out this encoding process use the Chinese Remainder Theory which renders it possible to transform an exponential with to 512 binary elements into two exponentials of 256 elements for each of these factors. The factors "p", "q" in their turn are substituted for "N" and the exponentiation operations are carried out in accordance with the modules "p" and "q".

European Patent Application No. 0,443,679 (PHQ 90.002) describes the manner in which these exponentiations are carried out. These teachings have been carried into practice in the microcontroller 83C852 manufactured by Philips. The modulo exponentiations are carried out with normalized numbers. This normalization consists in that three bytes are reserved which are used in the subsequent calculations. This application nevertheless proposes means for the case in which the numbers are not normalized. This implies in practice that it is necessary to provide two kinds of calculation processes, a first process for normalized numbers and another for non-normalized numbers. On the one hand this other process is much less adapted to the structure of the microcontroller and may lead to a lengthy calculation time, and on the other hand the presence of two processes takes up much space in the program memory.

This is where the invention finds a major application, i.e. in rendering possible the normalization of all proposed numbers N. These are multiplied by a normalization coefficient, after which a division is carried out by this same coefficient at the end of the exponentiation processes.

SUMMARY OF THE INVENTION

The invention has for its object to provide a device of the kind mentioned in the opening paragraph which is particularly well adapted to the microcontroller of the type mentioned above and which accordingly makes possible the use of all and any large numbers as modules while still providing a satisfactory processing speed.

For this purpose, the device of the kind mentioned in the opening paragraph is characterized in that it comprises estimation means for the value of Q for carrying out the operation:

$$A + Q' \cdot db_k = Q'' \cdot b^{n+k} + S \cdot b^k + R'$$

in which $db_k = b^{n+k} - D$ with $k \geq 1$ so that the value S, which acts as a separator, becomes zero for a value of Q' for which Q'' takes the value of Q and R' the value of R.

BRIEF DESCRIPTION OF THE DRAWINGS

The following description in conjunction with the annexed drawings, all given by way of non-limitative example, will render it clear how the invention may be carried into practice.

FIG. 3 is a flowchart an organigram of the operation of the device according to a preferred embodiment of the invention.

DETAILED DESCRIPTION OF THE PREFERRED EMBODIMENTS

Figure 1:
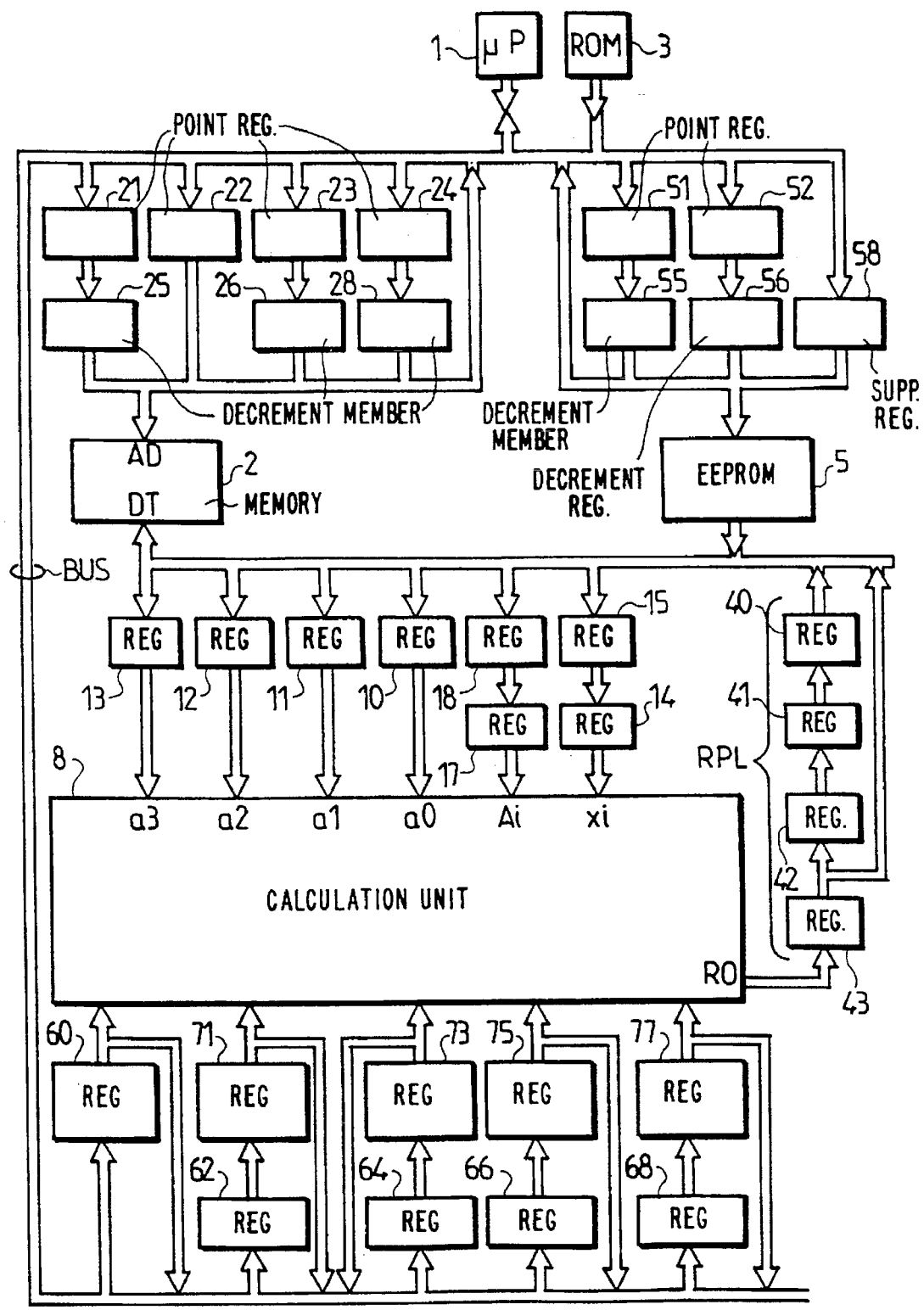
FIG. 1 shows the structure of a device in which the invention is applied.

The device of FIG. 1 is formed on the basis of a microprocessor 1, an active memory 2 provided with an address code input AD and an input/output facility for data DT, a read-only memory 3 containing in particular the operating instructions for carrying out the invention, and also an EEPROM 5 for the accommodation of different data, in the example described here in particular a normalization value for the divisor λ and the value $db_k$. In this Figure, these various elements are interconnected by a line BUS which operates in the multiplex mode, i.e. it transports data at some moments and address codes at other moments. The device of FIG. 1 also comprises a calculation unit 8 for carrying out multiplications with or without cumulation. This unit 8 comprises a set of four inputs a0, a1, a2 and a3 for receiving an operand of four bytes contained in registers 10, 11, 12 and 13, an input $x_i$ connected to registers 14 and 15 for a multiplicand with several bytes, an input $A_i$ connected to registers 17 and 18 for several bytes to be added, and an output RO for providing the result. Different operands are derived from the active memory 2. Depending on the input to which these operands are applied, pointer registers 21, 22 and 23 are used. Decrementation members 25 and 26 are associated with the registers 21 and 23. The register 21 relates to the operand to be applied to the input $A_i$, the register 22 to operands to be applied to the inputs a1, a2, a3 and a4, and the register 23 to the operand to be applied to the input $x_i$. Another pointer register 24 with its associated decrementation member 28 relates to the location in the memory 2 for accommodating the result provided at the output RO. Registers 40, 41, 42 and 43 accommodated in pipeline register RPL are provided also for receiving bytes which are available at the output RO. In a manner similar to that in memory 2, pointer registers 51 and 52 associated with decrementation members 55 and 56 are connected to the memory 5. A supplementary register 58 is also used for addressing.

The calculation unit 8 is controlled through various interposed registers 60, 62, 64, 66 and 68. The registers 71, 73, 75, 77 are directly governed by the calculation unit 8. Register 60 is a register in which commands for the unit 8 are stored as well as status information relating to the operations carried out by this unit. Register 62 is used for commanding the calculation unit 8. Register 64 serves to count the number of bytes in the result provided at the output RO. Register 66 gives the command for the start of writing into the memory 2 of information available at the output RO and offers the possibility of blocking the writing into the memory of a certain number of bytes, while register 68 is arranged for fixing the limits of the operands applied to the inputs $A_i$ and $x_i$, i.e. the numbers of bytes thereof. All further details can be found in the documentation on the aforementioned microcontroller 83C852.

The object of this device the object is to carry out a division of a dividend A formed by a large number "m" of bytes by a divisor D, preferably with $n \leq m$. The wanted result is to obtain the quotient Q and the remainder R.

Figure 2:
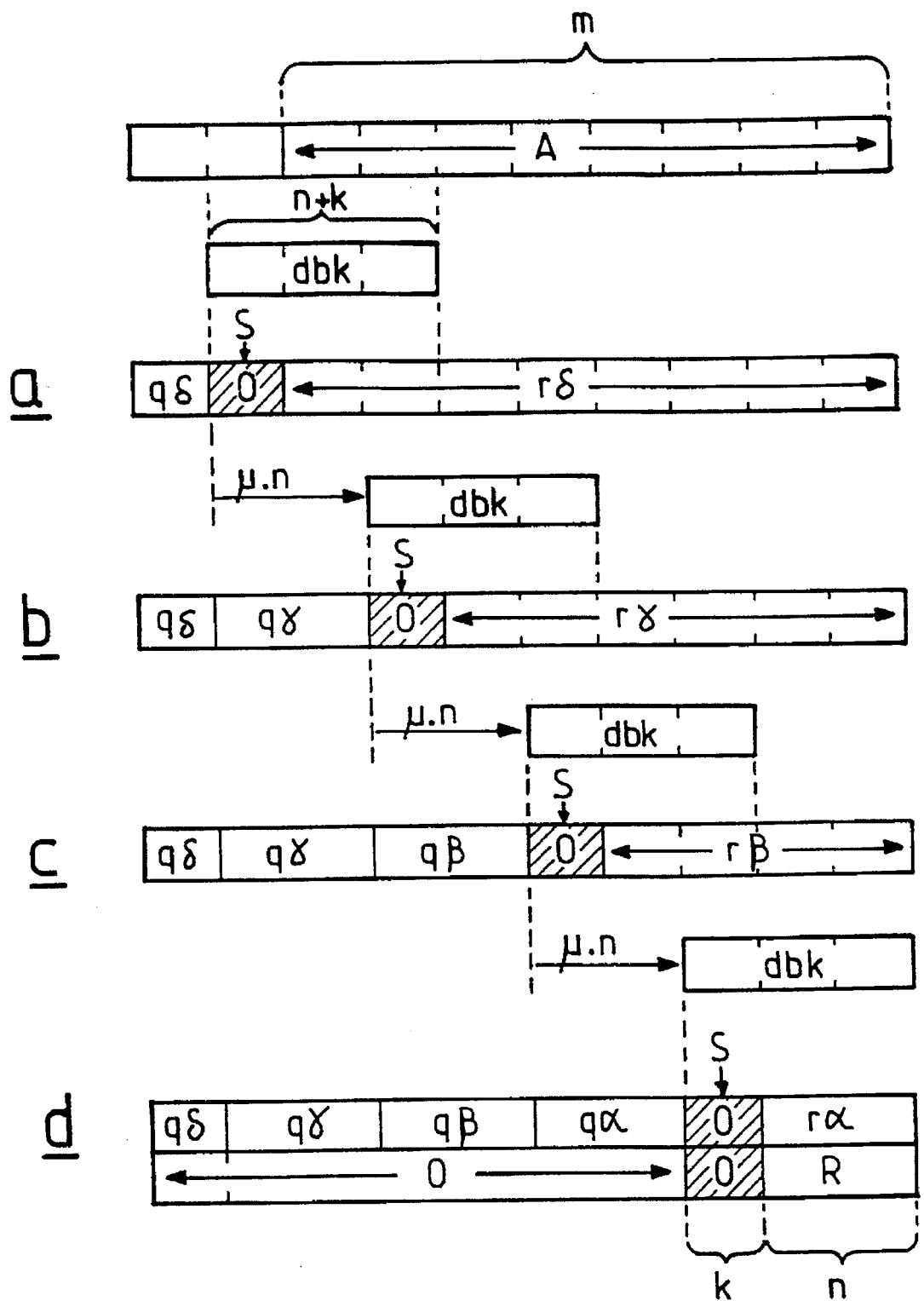
FIG. 2 shows how the invention operates in a highly diagrammatic way.

According to the invention, estimation means for Q are provided which carry out the operation:

$$A + Q'db_k = Q''\cdot b^{n+k} + S \cdot b^k + R' \qquad (1)$$

in which $db_k = b^{n+k} - D$ with $k \geq 1$, so that the value S, which acts as a separator, becomes zero for a value of Q'. So Q" assumes the value of Q and R' the value of R. According to another aspect of the invention, a given amount of memory locations are provided sufficiently for containing the dividend A. In these locations the various operations implied in the equation (1) will be carried out without unduly requiring supplementary locations. These operations will be carried out in multiprecision way, i.e. by operating successively on groups of words of the dividend formed by "m" words or, in the example described, by "m" bytes with multiples b' of the quantity $db_k$. The operations start with the highest weights or significances, which means multiplying $db_k$ by b' with J=m−n, i.e. to shift it towards the highest weights. The result of the operation (1) will be a value Q" which represents the high weights of the quotient. This latter quantity takes the value $q_\delta$ when the value zero of a separator S relating to "k" bytes becomes zero (see line "a" in FIG. 2). In practice, the separator is formed by a single octet. Then the same process is repeated while adjusting the value of $db_k$ by a value μ·n depending on the capacity of the multiplication member which forms part of the calculation member 8. This value may take the value x+y if the multiplication is carried out on operands comprising "x" and "y" bytes. Different quotient components $q_\gamma$, $q_\beta$ and $q_\alpha$ appear in succession, which is shown in lines "b", "c" and "d" of FIG. 2, respectively.

The invention is based on the following considerations. Let us first recall the division equation:

$$A = Q \cdot D + R; 0 \leq R < D$$

in which A is the dividend coded in "m" words, the base of which is "b", and D is the divisor coded in "n" words, the base of which is "b".

We assume that k is an integer $\geq 1$:
the complement to D in $Z_{Bn+k}$ is represented by $db_k$.

So we have:

$$A + Q \cdot db_k = Qb^{n+k} + r$$

When we consider the approximate format of the accumulator in which the result $A + Q \cdot db_k$ is present, we will see a separator (S) appear:

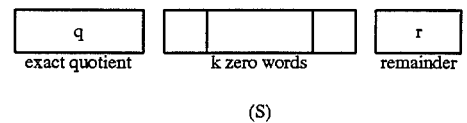

(S)

If an estimation error was made (by default) of the exact quotient q:

$$\hat{q} = Q - \delta: \text{estimated quotient}$$

Accordingly: $A + \hat{Q} \cdot db_k = Q \cdot b^{n+k} - \delta \cdot db_k + R$.

The separator is not zero. To determine δ, the estimation error which was committed, is sufficient to render the separator zero through successive additions of $db_k$ to the accumulator. This process may indeed be enhanced by the following observation:

if $v_0$ designates the value present in the separator, then:

$$A + \hat{q} \cdot db_k = \alpha_0 b^{n+k} + v_0 b^n + r_0$$

Considering that: $db_k = (b^k - 1)b^n + \overline{d_0}$, in which $\overline{d_0}$ represents the complement to D in a format comprising n words, then we obtain by addition of $v_0 \cdot db_k$:

$$A + (\hat{q} + v_0) db_k = (\alpha_0 + v_0) b^{n+k} + v_0 \overline{d_0} + r_0$$

Assuming that: $v_0 \overline{d_0} + r_0 = v_1 b^n + r_1$ it is concluded that:
(a) $v_1 < v_0$: the value in the separator becomes lower,
(b) the estimation of the quotient is more exact.

According to a preferred embodiment of the invention, moreover, a sign test is provided. This consists in that the value $db_k$ is added at the location of the separator so that the carry cannot be propagated or in other words, it is assured that the quotient component is not estimated at too low a value.

The flowchart of FIG. 3 represents each action in a rectangle. The pentagonal boxes represent tests; if the test result is positive, a step is made to the lower rectangle, if not, to the one on the right. The various boxes indicate the actions as explained below.

It is assumed that the dividend formed by M bytes is situated in a location of the memory 2 which will be referred to hereinafter as Accu{M, 1}. This notation means that the bytes placed inside the braces and separated by a comma are to be considered. Here, accordingly, all bytes up to M are to be considered, which represents the highest weights down to the octet 1 of the lowest weight. The M bytes Accu{M, 1} are indexed by the pointer registers 21 and 24. It is also assumed that the divisor, or rather the value $db_k$, is present in the EEPROM memory; this value is formed by 4+K bytes (K being the number of bytes of the separator); it is identified by the register 52. It is finally assumed that the normalization coefficient λ of the divisor D is also present in the EEPROM memory, but this is identified in its turn by 51. The coefficient λ is defined by: $\lambda = \text{MAX}\{x \in \mathbb{N}; x \cdot D \leq b^{n+k}\}$, where $\mathbb{N}$ denotes the set of positive integers.

K1: designates the action by which a value I representing the number of steps of the algorithm is put into a location of the memory 2 which acts as a counter. To determine this number I, the divisor is split up into groups of four bytes.

This correspond to the length of the multiplicands taking part in the multiplication operation which the calculation unit 8 is able to perform.

K2: is the action which sets to zero the bytes of the group of four lying on the side of the highest weights. The registers 23, 21 and 24 point towards the octet Accu{4I-7}.

K3: it is tested whether all steps have been carried out.

K10: represents the actual division operations.

K11: first of all, the four bytes of the normalization coefficient $\gamma$ are put in the four RPL registers; these bytes pass through the unit 10 by means of an instruction which commands a multiplication by a cumulation operand which is $\lambda$ and which fixes the multiplier to a value zero with the aid of the register 68.

K13: eight of the bytes (of the highest weights of the dividend, starting at the first step) contained in A{I, 4I-7} are multiplied. The result, formed in principle by twelve bytes here written as UC{12,1} will pass through the register RPL.

K15: of these twelve bytes, only four are retained, i.e. UC{11,8}. The byte of highest weight UC{12} is set aside so as to obtain a correct centring. UC{11,8} is subsequently transferred to the register RPL. It will be noted that the operations indicated in these boxes K11 and K13 do not require the presence of an intermediate memory outside the calculation unit. These bytes UC{11,8} constitute an approximate quotient value $\bar{q}$.

K17: the approximate quotient available in the register RPL, is now used for reducing the accumulator through addition of $\bar{q} \cdot db_k$. It will be noted that the approximate quotient appears in the RAM memory beyond the K separation bytes.

K19: the separator is isolated in Accu and applied to the inputs RPL. Note the 0,0,0 transmitted before the separator.

K21: the value of this separator is compared with zero. As long as this separator is not zero, the operations of box K23, which in its turn comprises the boxes K25 and K27, are carried out.

K25: the separator is multiplied by $db_k$ and added to the contents of Accu.

K27: the separator is again taken out and applied to RPL. This is continued until the separator takes the value zero.

K29: the sign test is started by adding $db_k$ to the contents of Accu, and the result is placed in the fictitious working locations UC{6,1}, the location UC{6} only will in fact be considered for the next box.

K31: the highest byte containing the carry-over value is put in the register RPL at the end of the test.

K33: here the test is carried out; as long as the contents are not equal to zero, the operation indicated for K35 is carried out.

K35: the value of $db_k$ is added to the contents of Accu.

K37: the value of I is decremented in order to proceed or not to operations of box K10.

An example of a division carried out in the decimal system is given in Annex 1. The dividend is 99145360 and the divisor is 80. The multiplication is assumed to be carried out on 2×2 digits, which implies that the capacity of the register RPL is also two digits and the separator has one digit. The normalization coefficient of the divisor is such that $\lambda \cdot D = 960$, i.e. $\lambda = 12$ and $db_k = 920$.

ANNEX 1

EXAMPLE WITH BASE 10 (DECIMAL)

D = 80                                              0 0 9 9 : 1 4 5 3 6 0

$db_k$ = 920

$\lambda$ = 12

$\hat{q}_0$ = 0099 × 12 = 001 : 188

$\hat{q}_0 \cdot db_k$ = 920 × 01 = 920  ⟶  9 2 0

1 0 1 9 sign test:      0 1 9       separator
                9 2 0
                ─────
                [0] 9 3 9

$\hat{q}_1$ = 1914 × 12 = 022 : 968          [1][0] 1 9   1 4

$\hat{q}_1 \cdot db_k$ = 920 × 22 = 20240  ⟶  2 0 2   4 0

1 2 2 1   5 4

1 × 920 = 920  ⟶  9   2 0

ANNEX 1-continued

EXAMPLE WITH BASE 10 (DECIMAL)

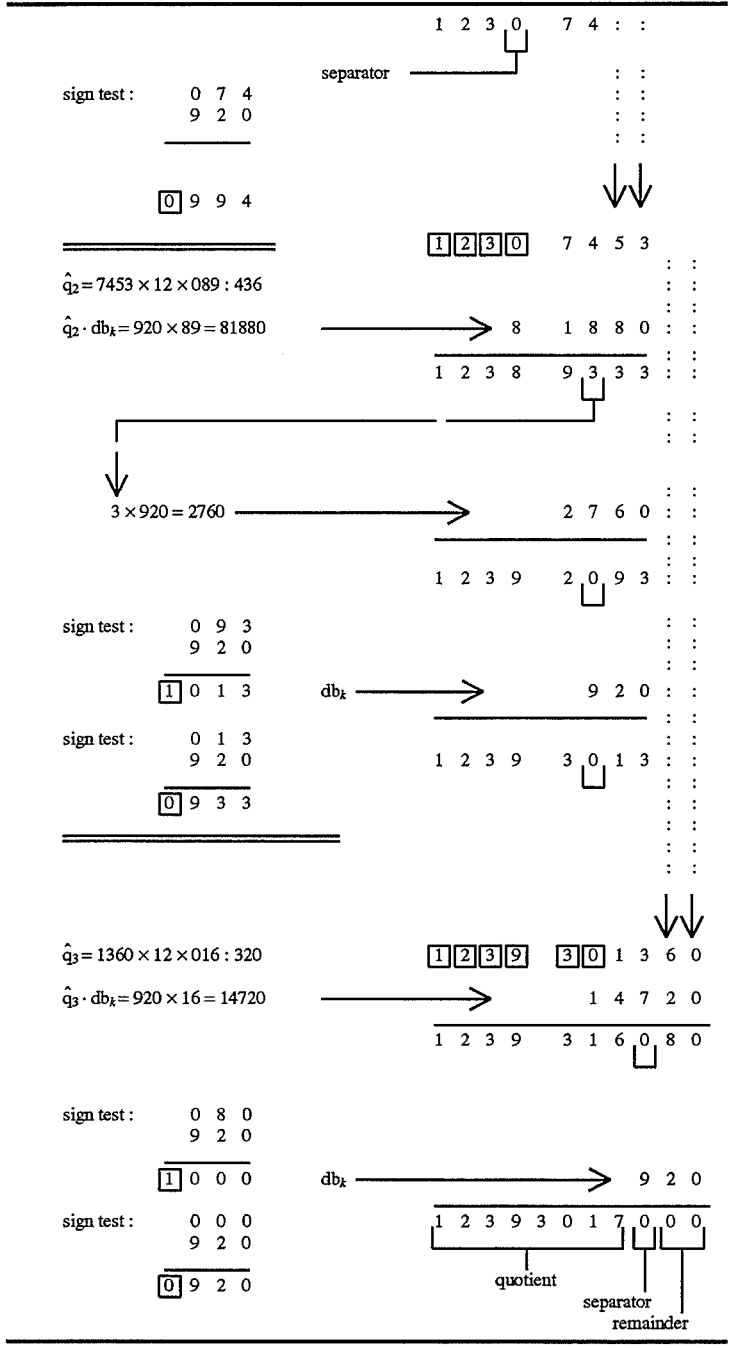

What is claimed is:

1. A device for generating a division of a dividend A formed by m words by a divisor D formed by n words having a base b to generate a quotient Q and a remainder R, comprising:

a memory for at least storing m words of the dividend;

estimation means for generating a value of Q by performing the function:

$$A + Q' db_k = Q'' \cdot b^{n+k} + S \cdot b^k + R'$$

in which $db_k = b^{n+k} - D$ with $k \geq 1$, k being an integer, and S is a separator which equals zero for a value of Q' for which Q'' takes a value of Q and R' takes a value of R, where Q' is an approximate quotient value and Q'' represents high weights of the quotient Q;

a multiplication member having a first input terminal for receiving x words of $db_k$ and a second input terminal for receiving y words of $b^j$ wherein J=m-n and for outputting the quantity $db_k \cdot b^j$;

testing means for determining whether the separator S is equal to zero;

accumulating means, coupled and responsive to the testing means, for adding a multiple of $db_k \cdot b^j$ to locations containing the divisor when the separator S is not equal to zero; and decrementation means for decrementing J by x+y when S is equal to zero so that R is contained in the n last locations in the memory and Q is contained in the "n+k"th location.

2. The device as claimed in claim 1, wherein said testing means are active in a verification phase by adding a quantity $db_k \cdot b^j$ to the quantity contained in portions of said location defined by J to examine whether the addition provides a carry-over and to actively add this quantity $db_k \cdot b^j$ if a carry-over results.

3. A device for carrying out a division of a dividend A formed by m words by a divisor D formed by n words, said words having a base b, to obtain a quotient Q and a remainder R, said device comprising:

a memory for at least storing said m words of the dividend; and means for generating Q by the function:

$$A + Q'db_k = Q'' \cdot b^{n+k} + S \cdot b^k + R',$$

in which $db_k = b^{n+k} - D$ with $k \geq 1k$ being an integer, so that the value S, which acts as a separator, becomes zero for a value of Q' for which Q" takes the value of Q and R' the value of R, where Q' is an approximate quotient value and Q" represents high weights of the quotient Q.

4. The device as claimed in claim 3, and including a multiplication member having a first input terminal for receiving x words of $db_k$ and a second input terminal for receiving y words of $b^j$ wherein J=m−n and for outputting the quantity $db_k \cdot b^j$.

5. The device as claimed in claim 3, and including testing means for determining whether the separator S is equal to zero.

6. The device as claimed in claim 5, and including accumulating means, responsive to the testing means, for adding a multiple of $db_k \cdot b^j$ to the locations containing the divisor when the separator S is not equal to zero.

7. The device as claimed in claim 4, and including decrementation means for decrementing J by x+y when S is equal to zero so that R is contained in the n last locations in the memory and Q is contained in the "n+k"th location.

8. The device as claimed in claim 5, wherein the testing means are active in a verification phase by adding a quantity $db_k \cdot b^j$ to the quantity contained in portions of said location defined by J to examine whether the addition provides a carry-over and to actively add the quantity $db_k \cdot b^j$ if a carry-over results.

* * * * *